Patented Dec. 11, 1934

1,984,061

UNITED STATES PATENT OFFICE 1,984,061

NITROCELLULOSE COATING COMPOSITION

Carleton Ellis, Montclair, N. J., assignor to Ellis-Foster Company, a corporation of New Jersey No Drawing. Application June 19, 1926, Serial No. 117,151. Renewed May 6, 1932

4 Claims. (Cl. 134—79)

This invention relates to nitrocellulose coating compositions, and particularly to such compositions as can be applied to various surfaces by means of an ordinary paint brush.

It is the object of my invention to produce liquid coating compositions containing nitrocellulose which can be brushed onto various surfaces with a paint brush and which will dry quickly without leaving brush marks permanently on the surface of said coating. It is equally important that such compositions be of substantially non-solvent action toward paint or varnish films and of such nature that these compositions can be brushed over such coatings without causing wrinkling or stripping of said undercoats. For household or interior use, it is advantageous to secure a product which contains solvents whose vapors are of non-toxic and non-cough inducing nature, preferably being of mild and not unpleasant odor. These qualities together with low cost and durability of said coating composition are characteristic of my invention.

It is further an object of my invention, at least in the preferred form, to employ as the nitrocellulose vehicle solely certain petroleum derivatives of a volatile character. A vehicle of this nature is composite and illustratively contains diacetone alcohol as a dissolvent of nitrocellulose, petroleum hydrocarbons as an extending agent or diluent and viscosity reducer, and a volatile secondary alcohol as a homogenizer. Diacetone alcohol when admixed with petroleum hydrocarbons of limited boiling point range, preferably such hydrocarbons as have been cracked and are relatively highly unsaturated forms solvents of particular value. However, the addition of another liquid such as a higher alcohol is necessary in order to properly blend the diacetone alcohol with the petroleum hydrocarbons and to homogenize the nitrocellulose. The use of secondary alcohols as the important homogenizing agent has been found to be of particular value, not only on account of their excellent homogenizing action, but also due to their non-cough inducing and relatively agreeable odors, and to their economic position such solvent mixtures as have been found to be of particular value for the production of nitrocellulose brushing lacquers and which are the feature of this invention can be derived entirely from petroleum, thus insuring practically an unlimited supply and at such low cost as will permit of ready competition with ordinary enamel or varnish products.

High boiling petroleum distillates when treated under suitable conditions are converted to lower boiling so-called cracked or unsaturated derivatives. Under the usual conditions a large amount of liquid highly unsaturated derivatives suitable for use as motor fuel are obtained, together with considerable amounts of gaseous unsaturated hydrocarbons, notably propylene, butylene and amylene. By adsorption in sulphuric acid with subsequent hydrolysis under such conditions as are now in commercial practice, these gases are converted into isopropyl secondary butyl and amyl alcohols. The isopropyl alcohol can be converted to acetone, the latter to diacetone alcohol. Diacetone alcohol, secondary alcohols and cracked liquid hydrocarbons are thus obtained from petroleum under the conditions indicated and may then be properly admixed and used according to this invention.

An example will serve to illustrate the invention. Cellulose nitrate, usually called nitrocellulose, and preferaby of the so-called low viscosity type is employed as the essential solid material of these compositions. In order to increase the thickness of the coating and produce more gloss and better adhesion, it is desirable, although not necessary, to incorporate a resin with the nitrocellulose. Various natural resins such as damar, rosin and rosin ester, congo, kauri, shellac, and the like, may be employed, although I prefer to use a synthetic resin which is compatible with nitrocellulose and of such nature as will increase the durability and which will confer greater film strength than do the natural resins. A suitable synthetic resin may be made, for example, by slowly heating a mixture of 47 parts by weight of glycerol, 80 parts of phthalic anhydride and 40 parts by weight of the distilled fatty acids from cottonseed oil, in a suitable container, to a temperature of approximately 280° C. An aluminum container closed at the top with the exception of an air-cooled reflux condenser is suitable for the purpose. Mechanical agitation is preferably employed continuously during the reaction and the heating continued until a sample has been shown to possess sufficient hardness, or until the acid number has become substantially less than twenty. Resins may also be made using the fatty acids of other oils, castor oil, rosin, and various carboxylic acids, although such resins are not exact equivalents of the cottonseed fatty acid product, since each will possess somewhat different solubility, hardness and color. Polyhydric alcohols other than glycerol may be used, likewise to vary the hardness, color or solubility, as the case may require. Glycol, pentaerythritol, mannitol, and the like, are suitable polyhydric alcohols.

It is usually desirable to incorporate with the nitrocellulose, either when used alone or in combination with resins, a softener or plasticizer, such as castor oil, diethyl or dibutyl phthalates, tricresyl phosphate, mixtures thereof, or like materials.

Pigments or dyes may be added to produce enamels or stains of various colors, according to the object desired. A blue lacquer enamel suitable for brush application was made as follows:—

40 parts by weight of diacetone alcohol were admixed with 30 parts by weight of liquid cracked petroleum hydrocarbons boiling between 70 and 130° C. 30 parts by weight of secondary butyl alcohol were then added. 12 parts by weight of one-half second viscosity nitrocellulose with 12 parts by weight castor oil phthalic glyceride resin were then added to this balanced vehicle and the mixture agitated until complete solution was obtained. The resin was made according to the proportions, and in the same manner as previously described. Pigment and plasticizer may be added to the clear lacquer and the whole well ground together in a ball mill or the pigment and plasticizer may be ground alone, or with the addition of some diacetone alcohol in a paint mill or roller mill and then added to the lacquer composition. In the present example 4 parts by weight of Prussian blue and 8 parts by weight of zinc oxide were well ground in a ball mill with 2 parts by weight of dibutyl phthalate, 2 parts by weight of tricresyl phosphate and 4 parts by weight of blown castor oil and said mixture then introduced and admixed with the clear lacquer to form a blue lacquer enamel suitable for brush application. The foregoing example is given merely as an illustration of a particular brushing composition and is not to be construed as limiting, since many variations in proportions of ingredients and the methods of manufacture may readily be made without departing from the principles of my invention. Other pigments, resins and plasticizers may be used, or entirely omitted, when desired, according to the object in view. High resin content tends to increase gloss, while high pigment content decreases gloss. High viscosity nitrocellulose, may, in some cases, be used, although not as desirably. Many variations in the method of incorporating the various ingredients are possible, and are all considered within the scope of this invention.

The feature of my invention of utilizing a peculiarly well balanced nitrocellulose vehicle, by means of which, in the preferred form, I obtain at low cost a relatively non-toxic and non-cough inducing composition, capable of being applied to paint, or varnish surfaces without wrinkling or blistering said surfaces and which on application will dry substantially free from brush marks.

The essential feature is that of incorporating nitrocellulose with diacetone alcohol, a liquid petroleum hydrocarbon of limited boiling point range and preferably of a cracked or unsaturated nature, by means of a solvent which acts as a homogenizing agent. Alcohols of proper boiling point and preferably the secondary alcohols such as isopropyl, secondary butyl and secondary amyl, have been found most suitable as homogenizing agents. Their particular values were indicated to some extent as follows:—

To a mixture of 80 parts by weight of diacetone alcohol and 50 parts by weight of cracked petroleum hydrocarbons boiling between 80° C. and 140° C. 8 parts by weight of one-half second viscosity nitrocellulose and 8 parts by weight of a synthetic resin made from glycerol phthalic anhydride and castor oil, were added. After extended agitation it was observed that a two-layer system had been formed, in which the nitrocellulose in solvated form were contained in the lower layer and the resin in the upper layer. The addition of 20 parts by weight of a secondary butyl alcohol sufficed to bring about complete homogenity of the mixture despite the fact that secondary butyl alcohol is generally regarded as a non-solvent for nitrocellulose. While compositions having some good properties may be derived from mixtures of diacetone alcohol and secondary alcohols alone, such solvents have been found to produce solutions of abnormally high viscosity and to often yield defective films on drying. The addition of cracked petroleum hydrocarbons has been found to reduce the viscosity and to yield better films, so that the peculiar value of the tertiary solvent mixture is evidenced.

While the proportions of the liquid components may be somewhat varied, it is usually necessary to have diacetone alcohol present in amount at least equal to 40 per cent by weight of the total vehicle. Gasoline or petroleum hydrocarbons boiling substantially between 80 and 160° C., and preferably of a cracked and unsaturated nature are employed in amounts substantially not exceeding 40 per cent by weight of the total vehicle and an alcoholic homogenizing agent such as isopropyl alcohol, secondary butyl alcohol or secondary amyl alcohol is admixed therewith in amount substantially not less than 20 per cent by weight of the total vehicle employed.

It has been found very important to closely regulate the boiling point of the petroleum hydrocarbon fraction, taking care not to use hydrocarbons which boil substantially above the boiling point of the diacetone alcohol, particularly should no large amounts of such high-boiling material be used. Very small proportions, that is, approximately 10 per cent by weight of the total solvent vehicle of a petroleum hydrocarbon boiling between 160–130° C., has been added without causing serious trouble, but it is in most cases strongly advisable not to use a hydrocarbon boiling over 160° C. By using closely fractionated hydrocarbon fractions, it is possible to regulate to a very large extent the brushing and drying qualities of these compositions, the brushing qualities tending to become poorer as the speed of drying is increased. The speed of drying is dependent largely upon the boiling point, and more particularly upon the relative rates of evaporation of the vehicle.

In some cases it has been found of advantage to use other acetone condensation products to partially displace a portion of the diacetone alcohol, e.g., mesityl oxide. The addition of other substances such as butyl acetate, butyl propionate, butyl butyrate, glycol ethers, glycol diacetate, ethyl lactate, butyl lactate, toluol, xylol, and other of the more common nitrocellulose solvents and diluents is not precluded, since I may utilize wherever desirable small amounts of these solvents in combination with my preferred vehicle.

My invention thus embraces a liquid coating composition containing nitrocellulose carried in a vehicle comprising a condensation product of acetone, preferably diacetone alcohol, a petroleum hydrocarbon viscosity reducer and diluent, and an alcohol homogenizer, said composition being capable of application to surfaces with a paint brush, without forming objectionable brush marks and without disintegrating undercoats.

What I claim is:—

1. A liquid coating composition containing low viscosity nitrocellulose carried in a vehicle comprising diacetone alcohol, a cracked petroleum viscosity reducer and diluent, and a secondary alcohol homogenizer.

2. A liquid coating composition containing low viscosity nitrocellulose carried in a vehicle comprising an acetone condensation product, an unsaturated cracked petroleum viscosity reducer and diluent, a resin, and a secondary alcohol homogenizer.

3. A liquid coating composition containing nitrocellulose, a synthetic resin compatible therewith, diacetone alcohol, a cracked petroleum viscosity reducer and diluent boiling between 80 and 160° C., and a secondary alcohol.

4. A liquid coating composition containing nitrocellulose carried in a vehicle comprising diacetone alcohol, a cracked petroleum viscosity reducer and diluent, and an alcohol homogenizer; said composition being capable of application to surfaces with a paint brush, without forming objectionable brush marks, and without disintegrating undercoats.

CARLETON ELLIS.